United States Patent [19]
Piltch et al.

[11] Patent Number: 5,052,011
[45] Date of Patent: Sep. 24, 1991

[54] EXPLOSIVELY PUMPED LASER LIGHT

[75] Inventors: Martin S. Piltch; Roy A. Michelotti, both of Los Alamos, N. Mex.

[73] Assignee: United States Department of Energy, Washington, D.C.

[21] Appl. No.: 641,821

[22] Filed: Jan. 16, 1991

[51] Int. Cl.⁵ ............................................. H01S 3/091
[52] U.S. Cl. ........................................ 372/77; 372/53; 372/67; 372/92
[58] Field of Search ......................... 372/77, 39, 67, 99, 372/103, 53, 92

[56] References Cited

U.S. PATENT DOCUMENTS

| | | | |
|---|---|---|---|
| 3,618,526 | 11/1971 | Baker | 372/77 |
| 3,646,471 | 2/1972 | Dement | 372/77 |
| 3,891,941 | 6/1975 | Roberts et al. | 372/77 |
| 3,904,985 | 9/1975 | Robinson et al. | 372/77 |
| 4,016,500 | 4/1977 | Pilloff | 372/77 |
| 4,099,142 | 7/1978 | Hershkowitz et al. | 372/77 |

OTHER PUBLICATIONS

"Arms Using Lasers Find Home on the Battlefield," Clarence A. Robinson, The Washington Times, Mar. 28, 1989.

Primary Examiner—Leon Scott, Jr.
Attorney, Agent, or Firm—Milton D. Wyrick; Paul D. Gaetjens; William R. Moser

[57] ABSTRACT

A single shot laser pumped by detonation of an explosive in a shell casing. The shock wave from detonation of the explosive causes a rare gas to luminesce. The high intensity light from the gas enters a lasing medium, which thereafter outputs a pulse of laser light to disable optical sensors and personnel.

25 Claims, 3 Drawing Sheets

EXPLOSIVELY PUMPED LASER LIGHT

The invention is a result of a contract with the Department of Energy (Contract No. W-7405-ENG-36).

BACKGROUND OF THE INVENTION

The present invention relates generally to laser light and, more specifically, to laser light pumped by explosives.

Conventional lasers for scientific and manufacturing purposes are pumped by various means. Among these are flash lamps, electric discharge, chemical reactions, and direct electron beam collision. Each of these provides sufficient pumping for a relatively high laser output. However, most lasers output no more than a few hundreds of millijoules. Although this output is more than adequate for many applications, it is too low for most military applications. Additionally, conventional lasers require external power supplies. This complicates their use in the field.

Presently, laser weapons are being increasingly applied to military actions, including urban and low intensity conflict. Lasers are normally non-lethal and do not damage structures. They are capable, however, of disabling or confusing personnel and sensing devices such as are employed on tanks. Unfortunately, conventional lasers capable of performing such functions are not suited for use in the field by the individual soldier.

The present invention does have the capability of damaging or confusing such sensing devices, rendering them ineffective, and can be easily employed by the individual soldier without the need for external power sources. It accomplishes this through use of controlled explosives to pump the lasing medium inside a conventional shell casing.

SUMMARY OF THE INVENTION

The present invention comprises an explosively pumped and a detonation well in said proximal end, with an explosive material packed into the proximal end of the casing adjacent to said detonation well for producing high pressure within said casing. A transparent window is mounted vertically inside the casing, spaced apart from the explosive material, and has an axial recess in its side facing the distal end of the casing. A luminescing gas is confined between said explosive material and said transparent window for luminescing in response to the high pressure produced by detonation of the explosive material. A rod of lasing material having proximal and distal ends is mounted coaxially within the casing, and has a total reflector attached to its proximal end, wherein the proximal end and attached reflector are secured in the recess in the transparent window. A partially reflecting mirror is mounted at the distal end of the casing, coaxial with the rod of lasing material, for outputting laser light.

In another aspect of the present invention, an explosively pumped laser comprises a casing having proximal and distal ends, with a detonation well in the proximal end of the casing. An explosive material is packed into the proximal end of the casing for producing, upon detonation, high pressure within the casing. A transparent window is mounted inside the casing, spaced apart from said explosive material, and having an axial recess in its side facing the distal end of the casing. A primarily monatomic gas is confined in the casing between the explosive material and the transparent window for luminescing in response to the high pressure produced by detonation of the explosive material. A rod of lasing material having proximal and distal ends is mounted coaxially within the casing, having a total reflector attached to its proximal end, wherein the proximal end and attached reflector are secured in the recess in the transparent window. Reflector means surround the rod of lasing material for concentrating light from the luminescing gas into the rod of lasing material. A partially reflecting mirror is mounted at the proximal end of the casing, coaxial with said rod of lasing material, for outputting laser light.

In still another aspect of the current invention an explosively pumped laser comprises a casing having proximal and distal ends and a detonation well in the proximal end. An explosive is packed into the proximal end of the casing adjacent to the detonation well for producing high pressure in the casing upon detonation. A disc of lasing material has its edge fixed at the distal end of the casing, and has a partially reflecting mirror applied to the edge of said disc of lasing material. A luminescing gas is in the casing between the explosive and the disc of lasing material. An angled total reflecting mirror is attached to the distal end of the casing opposite the partially reflecting mirror for outputting laser light from the disc of lasing material.

In a still further aspect of the current invention an explosively pumped laser comprises a casing having proximal and distal ends and interior and exterior surfaces and is sealed at the distal end by a transparent material. A detonation well is axially located in the proximal end of the casing. A cylinder of explosive is axially positioned in the casing adjacent to the detonation well for creating high pressure in the casing after detonation. A layer of lasing material having proximal and distal edges covers the interior surface of the casing. A total reflecting mirror is applied to the proximal edge of the layer of lasing material, and a partial reflecting mirror is applied to the distal edge of the layer of lasing material. A luminescing gas fills the casing for luminescing due to the pressure in the casing and causing the lasing material to lase.

BRIEF DESCRIPTION OF THE DRAWINGS

The accompanying drawings, which are incorporated in and form a part of the specification, illustrate the embodiments of the present invention and, together with the description, serve to explain the principles of the invention. In the drawings.

DETAILED DESCRIPTION

Figure 1:
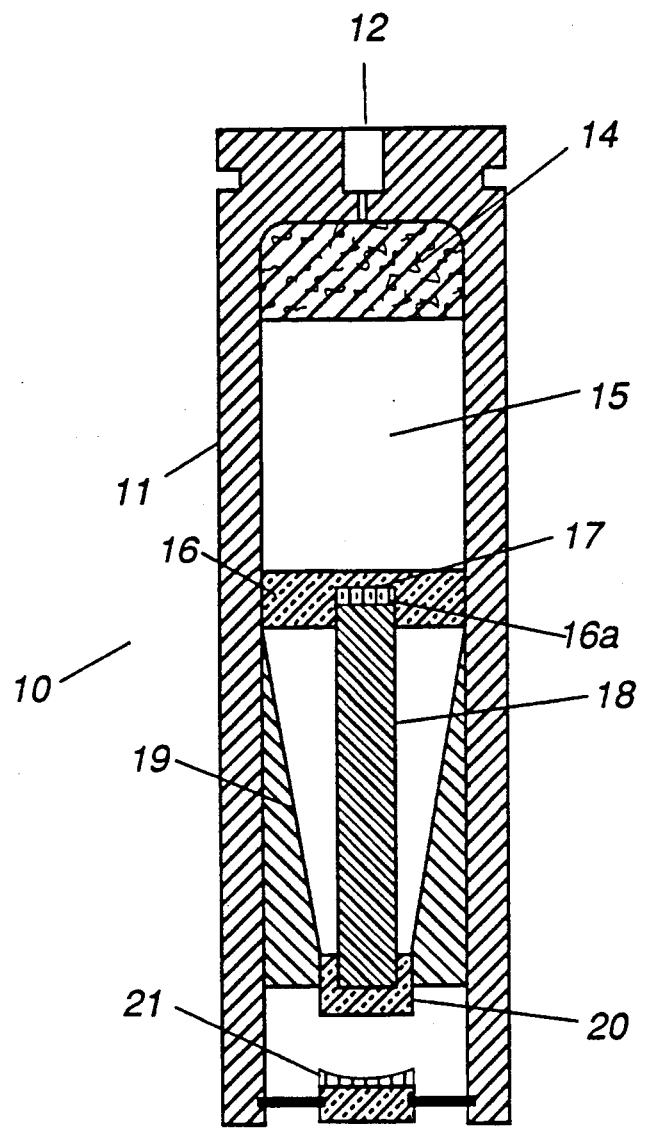
FIG. 1 is a cross-sectional view of one embodiment of the present invention in which a rod of lasing material located coaxially in the casing, and an explosive material is packed into the proximal end of the casing.

The present invention provides a high-power, single shot laser effective to disable optically sensitive sensor mechanisms such as those employed in modern tanks and other vehicles. It can be easily transported and employed by the individual soldier. The invention can be best understood by reference to FIG. 1, wherein a cross-section of one embodiment of the invention is illustrated and generally denoted as explosive laser 10.

Explosive laser 10 is contained within a shell casing 11, which is preferably constructed of steel or a composite material, although other materials may also perform satisfactorily. Explosive 14 is packed into casing 11, adjacent to detonator well 12. A detonator (not shown) suited for detonation of explosive 14 would reside in detonator well 12.

Explosive 14 may be any of several compounds, but approximately 3 grams of a Plastic Bonded Explosive (PBX) has been shown to perform well. Generally, an explosive should have an energy content of approximately 5 kJ/g.

Spaced apart from explosive 14 toward the open end of casing 11 is transparent window 16. Transparent window 16 may be conveniently a quartz plate, although other materials may be used as long as they are transparent to light. Window 16 may contain central recess 16a on its face, which is directed toward the open end of casing 11.

The interior area of casing 11, and particularly the space between explosive 14 and window 16, is filled with primarily monatomic gas 15, which preferably is Argon, Xenon, or Krypton gas, or a mixture of those gases, although others will work at different levels of efficiency. Monatomic gases luminesce in the presence of a shock wave such as is produced by explosive 14, and produce a flash of extremely high intensity light.

Total reflector 17 and one end of lasing medium 18 may be maintained in recess 16a in window 16, although it could also be maintained in a spider (not shown) or by adhesives. Conical reflector 19, which may be shaped as a truncated conic section, surrounds lasing medium 18 to reflect light produced by rare gas 15 into lasing medium 8. The other end of lasing medium 18 is maintained in transparent bracket 20, which is itself supported by conical reflector 19. Finally, output coupling reflector 21 is mounted in a position spaced apart from, but aligned with, lasing medium 18. As with any laser, output coupling reflector 21 is a partially reflecting mirror.

Lasing medium 18 is cylindrically shaped, and may be any liquid or plastic dye laser material. Conical reflector 19 should be an effective reflector of light. Aluminum has proved to be satisfactory, although other highly effective reflective materials may provide enhanced output.

In operation, a detonator (not shown) in detonator well 12 would, upon initiation by an operator, detonate explosive 14. This detonation produces a shock front in rare gas 15 causing rare gas 15 to luminesce and to produce very high temperature light. This light passes through transparent window 16, and is reflected into lasing medium 18.

The high temperature light reflected into lasing medium 18 causes it to lase, and to output high energy laser light through output optical coupling reflector 21. This output is sufficient to confound sensors and temporarily disable enemy soldiers. All of this occurs within approximately 20 microseconds after detonation of explosive 14. After firing, casing 11 may easily be extracted.

Figure 2:
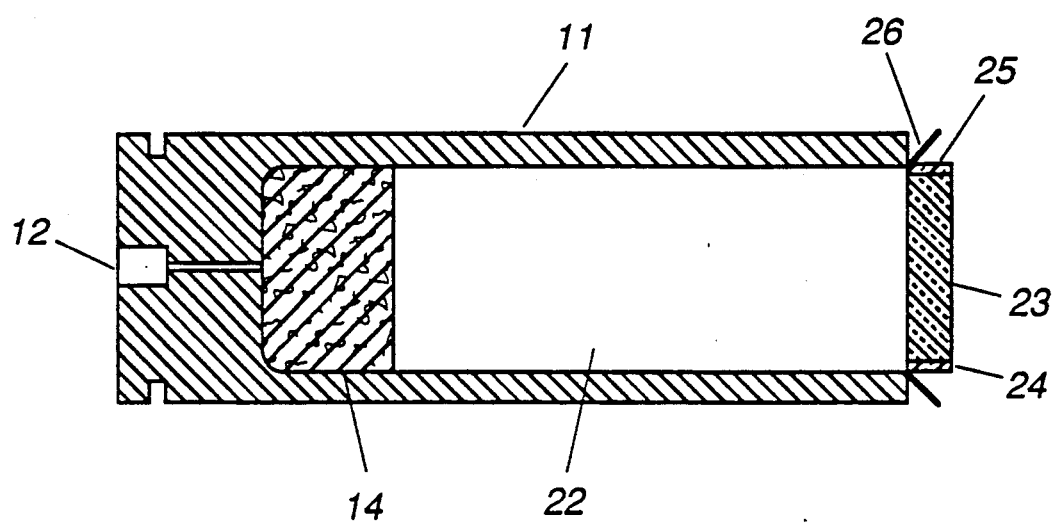
FIG. 2 is a cross-sectional view of another embodiment of the present invention in which a lasing disc is placed at the distal end of the casing.

Another embodiment of the present invention is illustrated in FIG. 2 wherein a longitudinal cross-section view reveals explosive 14 packed into the proximal end of casing 11 adjacent to detonation well 12, as in FIG. 1. At the distal end, plastic laser disc 23 is fixed. Primarily monatomic gas 22 is filled in the space between explosive 14 and laser disc 23. Laser disc 23 has partially reflecting mirror 25 applied to its edge 24, and angled total reflector mirror 26 attached to casing 11 opposite edge 24 for outputting laser light from laser disc 12.

In this case, detonation of explosive 14 causes gas 22 to luminesce and pump laser disc 23. Laser light from laser disc 23 is output through partial reflector 25 to angled total reflector 26, which redirects the light axially from casing 11.

Figure 3:
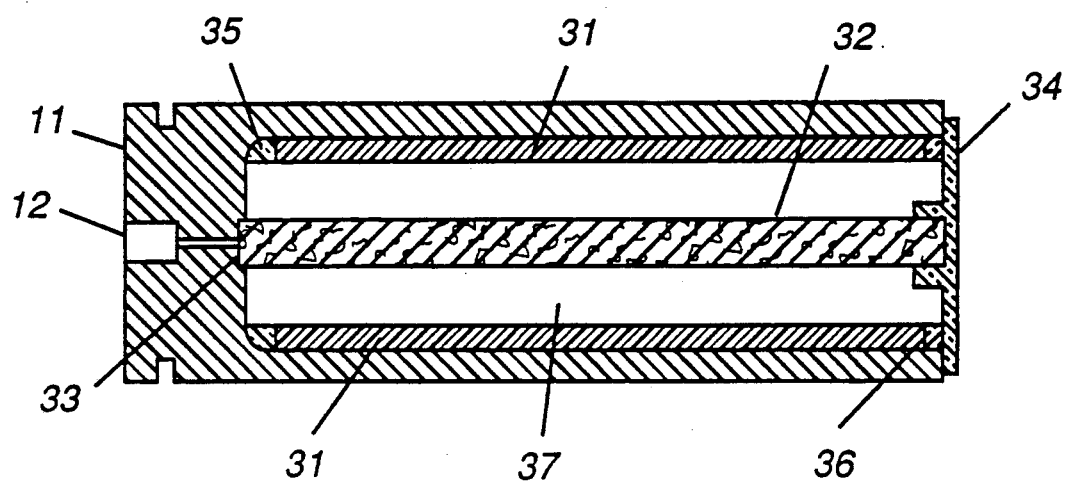
FIG. 3 is a cross-sectional view of still another embodiment of the current invention in which a rod of explosive material is surrounded by a layer of lasing material applied to the inner surface of the casing.

Another embodiment of the present invention is illustrated in a longitudinal cross-sectional view in FIG. 3. In FIG. 3, the interior of casing 11 is coated with lasing material 31, and explosive rod 32 is located axially within casing 11, adjacent to detonation well 12. Explosive rod 32 is mounted in casing 11 by having its proximal end placed in indent 33 of casing 11, and its distal end supported by transparent bracket 34.

In this embodiment, total reflector 35 is ring shaped and is located at the proximal end of lasing material 31. Partial reflector 36 is also ring shaped and is located at the distal end of lasing material 31, adjacent to transparent bracket 34. As in other embodiments, space 37 is filled with a rare gas.

Also, as with other embodiments, detonation of explosive rod 32 through detonation well 12 will create a shock wave, which will cause the rare gas in space 37 to luminesce. This intense light causes lasing material 31 to output a high intensity light pulse through partial reflector 36.

The present invention, which can be used by the individual soldier, or in conventional large caliber weapons, can be extremely useful in urban warfare and low intensity battles. It is non-lethal, but can be extremely useful in disabling optical sensors in tanks and individuals.

The foregoing description of the embodiments of the invention has been presented for purposes of illustration and description. It is not intended to be exhaustive or to limit the invention to the precise form disclosed, and obviously many modifications and variations and applications are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. An explosively pumped laser comprising:
   a casing having proximal and distal ends and a detonation well in said proximal end;
   an explosive material packed into said proximal end of said casing adjacent to said detonation well for producing high pressure within said casing;
   a transparent window mounted vertically inside said casing, spaced apart from said explosive material;
   a luminescing gas confined between said explosive material and said transparent window for luminescing in response to said high pressure produced by detonation of said explosive material;
   a rod of lasing material having proximal and distal ends mounted coaxially within said casing, having a total reflector attached to its proximal end; wherein said proximal end and attached reflector are secured in said recess in said transparent window; and a partially reflecting mirror mounted at said distal end of said casing, coaxial with said rod of lasing material for outputting laser light.

2. The apparatus as described in claim 1, further comprising reflector means located between said transparent window and said distal end of said casing for concentrating light from said luminescing gas into said rod of lasing material.

3. The apparatus as described in claim 2, wherein said reflector means comprises a truncated conic section.

4. The apparatus as described in claim 3, wherein said truncated conic section comprises aluminum.

5. The apparatus as described in claim 1, wherein said rod of lasing material comprises a dye-doped plastic.

6. The apparatus as described in claim 1, wherein said luminescing gas comprises a primarily monatomic rare gas.

7. The apparatus as described in claim 6, wherein said primarily monatomic gas is one or more of the group comprised of Argon, Xenon, or Krypton.

8. The apparatus as described in claim 1, wherein said casing comprises steel.

9. The apparatus as described in claim 1, wherein said explosive material comprises approximately 3 grams of a Plastic Bonded Explosive.

10. An explosively pumped laser comprising:
a casing having proximal and distal ends;
a detonation well in said proximal end of said casing;
an explosive material packed into said proximal end of said casing for producing, upon detonation, high pressure within said casing;
a transparent window mounted inside said casing, having an axial recess in its side facing said distal end of said casing, and spaced apart from said explosive material;
a primarily monatomic gas confined in said casing between said explosive material and said transparent window for luminescing in response to said high pressure produced by detonation of said explosive material;
a rod of lasing material having proximal and distal ends mounted coaxially within said casing, having a total reflector attached to its proximal end, wherein said proximal end and attached reflector are secured in said recess in said transparent window;
reflector means surrounding said rod of lasing material for concentrating light from said luminescing gas into said rod of lasing material; and
a partially reflecting mirror mounted at said proximal end of said casing, coaxial with said rod of lasing material for outputting laser light.

11. The apparatus as described in claim 10, wherein said reflector means comprises a truncated conic section.

12. The apparatus as described in claim 11, wherein said truncated conic section comprises aluminum.

13. The apparatus as described in claim 10, wherein said rod of lasing material comprises a dye-doped plastic.

14. The apparatus as described in claim 10, wherein said primarily monatomic gas is one or more of the group comprised of Argon, Xenon, or Krypton.

15. An explosively pumped laser comprising:
a casing having proximal and distal ends and a detonation well in said proximal end;
an explosive packed into said proximal end of said casing adjacent to said detonation well for producing high pressure in said casing upon detonation;
a disc of lasing material having its edge fixed at said distal end of said casing;
a partially reflecting mirror applied to said edge of said disc of lasing material;
a luminescing gas in said casing between said explosive and said disc of lasing material;
an angled total reflecting mirror attached to said distal end of said casing opposite said partially reflecting mirror for outputting laser light from said disc of lasing material.

16. The apparatus as described in claim 15, wherein said disc of lasing material comprises a dye-doped plastic.

17. The apparatus as described in claim 15, wherein said luminescing gas comprises a primarily monatomic rare gas.

18. The apparatus as described in claim 17, wherein said primarily monatomic gas is one or more of the group comprised of Argon, Xenon, or Krypton.

19. An explosively pumped laser comprising:
a casing having proximal and distal ends and interior and exterior surfaces and being sealed at said distal end by a transparent material;
a detonation well axially located in said proximal end of said casing;
a cylinder of explosive axially positioned in said casing adjacent to said detonation well for creating high pressure in said casing after detonation;
a layer of lasing material having proximal and distal edges covering said interior surface of said casing;
a total reflecting mirror applied to said proximal edge of said layer of lasing material;
a partial reflecting mirror applied to said distal edge of said layer of lasing material; and
a luminescing gas filling said casing for luminescing due to said pressure in said casing and causing said lasing material to lase.

20. The apparatus as described in claim 19, wherein said disc of lasing material comprises a dye-doped plastic.

21. The apparatus as described in claim 19, wherein said luminescing gas comprises a primarily monatomic rare gas.

22. The apparatus as described in claim 21, wherein said primarily monatomic gas is one or more of the group comprised of Argon, Xenon, or Krypton.

23. A method of producing high energy laser light comprising the steps of:
placing an explosive, a luminescing gas, and a lasing medium in a casing;
detonating said explosive, said detonation causing said rare gas to produce high intensity light due to pressure from said detonation;
reflecting said light into said lasing medium;
outputting high intensity laser light from said lasing medium.

24. The method as described in claim 23, wherein said luminescing gas comprises a primarily monatomic gas.

25. The method as described in claim 24, wherein said primarily monatomic gas is one or more of the group comprised of Argon, Xenon, or Krypton.

* * * * *